Jan. 14, 1969    J. W. EDWARDS ET AL    3,421,811
COATED OPTICAL DEVICES
Filed Oct. 31, 1967

PERCENT REFLECTANCE
WAVELENGTH MICRONS

INVENTOR
JAMES W. EDWARDS
RONALD B. COFFEY
BY
Robert J. Schaap
ATTORNEY

# United States Patent Office 3,421,811
Patented Jan. 14, 1969

3,421,811
COATED OPTICAL DEVICES
James W. Edwards, Creve Coeur, Mo., and Ronald B. Coffey, Raleigh, N.C., assignors to Monsanto Company, St. Louis, Mo., a corporation of Delaware
Continuation-in-part of application Ser. No. 311,992, Sept. 27, 1963. This application Oct. 31, 1967, Ser. No. 679,372
U.S. Cl. 350—166  10 Claims
Int. Cl. G02b 5/28

ABSTRACT OF THE DISCLOSURE

An optical device having a substrate which is transparent in the wave length range in which it is desired to transmit radiation. An optically thin film having at least two layers is disposed on one flat surface of the substrate and has at least one optically active layer having a high index of refraction and a thickness of at least one-fourth low index refraction. The optically active layer having a wave length. The optically thin film also has one layer of high index of refraction is formed of either lead molybdate, lead tungstate, or lead chromate.

---

Figures 1, 2:
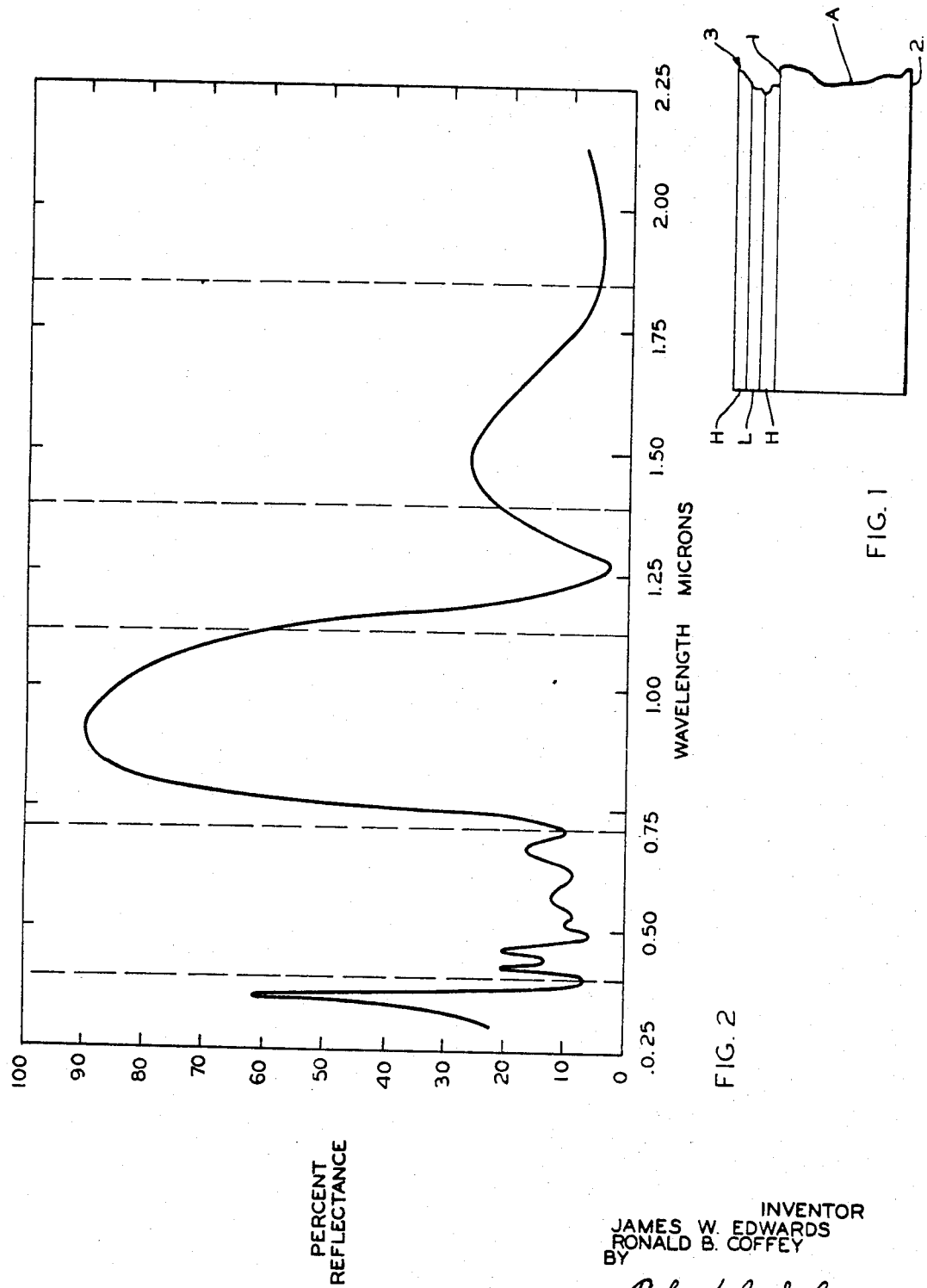

This application is a continuation-in-part of my copending application Ser. No. 311,992, filed Sept. 27, 1963, now abandoned.

This invention relates in general to certain new and useful improvements in optically thin films, and more particularly, to dielectric compounds used in the preparation of optically thin films.

In recent years, there has been an increasing interest in the use of optically thin films for selectively altering the optical characteristics of various optical devices. The increasing use and study of optically thin films are in part due to the rapid strides which have been made in the techniques of producing multilayer thin films. With the diversity of uses of optically thin films, various new methods of thin film application have recently been developed. The most extensively employed methods of film application include the electrolytic deposition method, the chemical method, the method of sputtering, and the method of evaporation.

Although films of many metals may be easily formed by the electrolytic deposition method which consists of an electrolysis process, it has not been widely used. This method suffers from the disadvantages that the properties of the film are dependent on a number of factors which are not readily controllable. Moreover, the fact that these films are produced in the presence of an electrolyte makes it likely that they will contain adsorbed foreign molecules. Chemical methods of film deposition are used only in selected cases since it is often difficult to control the process of deposition and moreover, it is difficult to control the purity of the film.

For certain metals, such as platinum and molybdenum which have high melting points, the sputtering technique of film deposition is often employed. This process consists of maintaining a discharge in an inert gas at a relatively high distention. The surface of a cathode, being made of the metal to be sputtered, is subjected to local boiling which results from the bombardment of the cathode by positive ions. However, this method of film deposition has not been largely successful since the maintaining of an accurate beam density and deposition temperature is critical. Moreover, condensation often occurs on the cathode surface which interferes with the sputtering.

The most extensively used method of film deposition is that of thermal evaporation since it possesses many advantages over the other above-described methods. Some of these advantages lie within the ease in which the process may be controlled. Moreover, films of high purity are readily produced with a minimum of interfering conditions. In spite of this favorable aspect, recent studies have shown that the properties of evaporated films have not always shown the consistency which is expected. Furthermore, the evaporation method is not universally applicable in practice for high melting point material. This is a particularly series defect when this method is used for the preparation of multi-layer optically thin films. Many of the multi-layer thin films presently employed consist of alternating layers of dielectric material having low and high indexes of refraction. The materials employed for layers having high indexes of refraction, for the most part, consist of compounds which are not very volatile and hence are not readily adaptable for film deposition by the thermal evaporation process. Moreover, these compounds present other formidable technical problems due to the high temperatures of evaporation and therefore are not readily usable for objects having large surface areas to be controlled.

It is, therefore, the primary object of the present invention to provide a group of selected compounds having high refractive indices, and which are capable of being applied as a thin film by the thermal evaporation process at relatively low temperatures.

It is another object of the present invention to provide a selected group of thin film compounds of the type stated which have good adherence properties and good abrasion resistant properties.

It is a further object of the present invention to provide a selected group of thin film compounds of the type stated which have desired properties for use in multi-layer dielectric films.

It is an additional object of the present invention to provide a selected group of thin film compounds of the type stated which are relatively inexpensive and are commercially available.

It is another salient object of the present invention to provide a selected group of thin film compounds of the type stated which readily lend themselves to use in a wide variety of optical applications.

Other objects and advantages of this invention will be apparent to one skilled in the art upon studying the specification.

In the accompanying drawings:

FIGURE 1 is a schematic front elevational view of a transparent substrate having applied to one flat surface thereof a multi-layer dielectric film which has been formed in accordance with the present invention; and FIGURE 2 is a graphical illustration showing the percentage of reflected radiation for a given wave length range of radiation when such radiation is passed through a glass substrate having an optically thin multi-layer dielectric film formed in accordance with the present invention.

Generally speaking, the present invention resides in a discovery that a selected group of compounds exhibits excellent optical characteristics for use in multilayer optically thin films. It has been found that all compounds within this selected group of compounds have high indexes of refraction and are capable of thin film deposition by a thermal evaporation process. Moreover, the compounds within this selected group form tightly adherent films, and show good abrasion resistant qualities.

Referring now in more detail and by reference characters to the drawings which illustrate practical embodiments of the present invention, A designates a glass substrate having top and bottom faces 1, 2 respectively. While the substrate A selected is glass, it should be understood that any media which is transparent in the desired wave length range, such as quartz, for example, could be used and the invention is not limited to the use of glass as a substrate. For example, if it were desired to transmit radiation in the infrared wave length range, a substrate of arsenic trisulfide would be employed.

Suitably applied to the upper surface 1 of the substrate A preferably by evaporation techniques is a multilayer optically thin dielectric film 3, which consists of alternating dielectric low index of refraction layers L and high index of refraction layers H. The layer H is facewise disposed upon the face 1 of the substrate A, and interposed between the layers 4, 5 is a dielectric layer 7 having a relatively low refractive index. Similarly interposed between the layers 5, 6 is a dielectric layer 8 also having a relatively low refractive index. Preferably, each of the high index layers H may be formed of the same high refractive index material and the low index layers L are formed of the same low refractive index material. However, it is not necessary to employ the same high or low index of refraction material for each high or low index layer in any one optical device. In actual practice, each of the succeeding layers forming part of the film 3 are formed by vapor film deposition. However, the present invention is not limited to this method and any suitable conventional method of applying these layers could be employed.

More particularly, the present invention includes a group of dimetallic salts of the general formula $XYO_4$ having four oxygen atoms which serve as the high index of refraction layers. Included within this group of compounds are lead tungstate ($PbWO_4$); lead molybdate ($PbMoO_4$); and lead chromate ($PbCrO_4$).

It can be seen that each of the above listed compounds contains four oxygen atoms and one atom of lead and one different metal atom. Moreover, each of the compounds are formed by a combination of metals of two classes X and Y, the first class X consisting of tin, cadmium and lead; and the second class Y consisting of molybdenum, tungsten and chromium. It should be noted that each of these compounds contains heavy elements which have a large number of electrons surrounding the nucleus and thereby provide compounds with a high index of refraction. Furthermore, these compounds possess a high degree of volatility.

The aforementioned group of compounds is each formed by combining oxides of each of the metals forming the final compound. The metal lead exists in +2 valence states where it normally is combined with a single atom of oxygen, rendering lead oxide. The metals molybdenum, tungsten and chromium exist in a +6 valence state where each will combine with three oxygen atoms, thus rendering molybdenum oxide ($MoO_3$); tungsten oxide ($WO_3$); and chromium oxide ($CrO_3$). Thus, the above-mentioned group of compounds which are suitable for use in the present invention, are formed by reacting the oxide of lead with the oxide of a metal having a +6 valence state. For example, when it is desired to form lead tungstate, lead oxide is reacted with tungsten oxide to form lead tungstate. The two reactants are heated to the temperature of 700–1,000° C. and the reaction proceeds very rapidly. Preferably, the reactants are in the form of a finely divided powder. It should also be understood that it is possible to use solid solutions of at least any two of the above-mentioned compounds for the preparation of dielectric layers in a multilayer film.

The dielectric layers formed of any of the above-mentioned compounds or solid solutions of any such compounds would be used in conjunction with alternating layers of dielectric material having a relatively low refractive index, such as for example magnesium fluoride, thorium oxyfluoride, cryolite, calcium fluoride, lithium fluoride, aluminum fluoride, calcium silicate, and aluminum oxide. The above list is merely exemplary and any of the conventional well-known low refractive index materials can be used.

The dimetallic salts included within the scope of the present invention are all conveniently applied through the thermal evaporation process. The thermal evaporator is normally operated at a temperature where the compounds have a vapor pressure of not less than 5.0 microns and not more than 15.0 microns, and preferably about 10 microns. The pressure of the gas is obviously fixed at any selected temperature. Moreover, the rate at which the molecules of the dielectric materials strike the substrate is determined by the vapor pressure thereof. With these vapor pressures, a film thickness of up to 1500 angstroms can be formed in about 150 seconds. It has been found in connection with the present invention that the material from which the substrate is formed has no material effect in the application of the thin films. The refractive index of the substrate, of course, does materially affect the optics of the system since the substrate is sufficiently thick so that it constitutes a "massive" layer.

The low refractive index layers such as magnesium fluoride, cryolite, etc., are also conveniently applied by the thermal evaporation process using almost identical application conditions. The optically thin films are usually formed of alternating layers of high refractive index materials and low refractive index materials, the thickness of each of the layers being determined by the desired optical qualities to be obtained. The method of selecting the thickness of the films of the various layers is more fully described in copending application Ser. No. 299,851, filed Aug. 5, 1963 and is, therefore, not described in more detail herein. However, when the multilayer films are used for interference filters and heat reflecting films, the thickness of the high dielectric layer usually ranges from 0.05 micron to 0.20 micron. The thickness of the low dielectric layer usually ranges from 0.12 to 0.22 micron.

In connection with the present invention, it has been found that by forming each of the high refractive index layers H and each of the low refractive index layers L with an optical thickness of one-quarter wave length for the maximum wave length to be reflected at the center of the principal reflectance band, optimum results are obtained. Accordingly for the purposes of the present invention, each of the layers employed herein will have an optical thickness of at least one-quarter wave length. For quarter wave low refractive index layers the thickness can be determined by the following relationship:

$$t_L = \lambda_0 / 4n_L$$

where $t_L$ represents the thickness of the low index of refraction layers, $\lambda_0$ represents the wave length to be reflected at the center of the principal reflectance band, and $n_L$ represents the refractive index of the low refractive index layers. Similarly, for quarter-wave high refractive index layers, the thickness can be determined by the following relationship:

$$t_h = \lambda_0 / 4n_h$$

where $t_h$ represents the thickness of the high refractive index layers, and $n_h$ represents the index of refraction of the high refractive index layers.

The index break between the alternating layers of high and low refractive indices should be as large as possible and should be at least 0.4. As used herein the materials having a "high" index of refraction will have an index of at least 2.0; and the materials having a "low" index of refraction will have an index no greater than 1.6.

It is also possible to form solid solutions of any of the high index of refraction compounds herein and use the same as a high index of refraction layer. It is also possible to use as high index of refraction layers a solid solution of any of the lead containing compounds described herein with any of the high refractive index compounds described in my copending application Ser. No. 679,371, filed Oct. 31, 1967. These latter compounds are tin molybdate, tin tungstate, tin chromate, cadmium molybdate, cadmium tungstate or cadmium chromate.

The aforementioned dimetallic compounds are also useful for single layer films. These single layer films are advantageously employed as antireflection layers in solar cells or in beam splitters. For example, it is often desirable to separate wave length ranges of radiation without much selectivity and layers formed of the aforementioned compounds are particularly effective for such purposes.

It was found that when any of the above-mentioned metallic salts were applied as an optically thin film to transparent substrates, such as glass and quartz, massive plastic layers such as polyvinylbutyral, or optical crystalline substances such as sodium chloride, potassim chloride or calcium fluoride, the film exhibited excellent adherence characteristics. Adhesively coated tapes were pressed onto the surface of the film and removed to determine the degree of film adherence. Rapid stripping indicated that the film could not be lifted by the adhesive. Moreover, films of these metallic salts failed to readily dissolve in water or organic solvents such as benzene, toluene, carbon tetrachloride and xylene.

The invention is further illustrated by, but not limited to, the following examples.

EXAMPLE 1

An opically thin film having four alternating layers of a high index of refraction material (lead molybdate) and three alternating layers of a low index of refraction material (magnesium fluoride) is applied to a glass substrate to selectively alter the optical characteristics of the substrate.

The lead molybdate is applied to the glass substrate having a surface area of 120 square centimeters and a thickness of 0.3 centimeter, by the thermal evaporation process, until a film thickness of 1020 angstroms per layer is obtained. The lead molybdate is heated in the thermal evaporator to a temperature where it is capable of being vapor deposited at a rate of 400 angstroms thickness per minute. The magnesium fluoride is applied by the thermal evaporation process as a thin film with a thickness of 1640 angstroms per layer to the outer surface of the lead molybdate film. The magnesium fluoride is applied at a rate to deposite 660 angstroms per minute in thickness of film to the entire surface area of the substrate.

When light having the spectral distribution of solar radiation is directed on the film at an angle of incidence of 0°, approximately 87% of the light within the infrared wave length range (0.70 to 1.15 microns) is reflected. Moreover, approximately 87% of the light within the visible wave length range (0.40 to 0.70 micron) is transmitted through the film. When light having the same spectral distribution, that is the spectral distribution of solar radiation, is directed on the film at an angle of incidence of 30°, the reflectance and transmittance of the infrared light and the visible light respectively, is substantially similar to the results obtained when the light is directed at an angle of incidence of 0°. Moreover, approximately 44% of the incident energy carried by the light directed on the film is in the visible wave length range and only approximately 13% of the energy in this wave length range is reflected. On the other hand, approximately 55% of the incident energy in the light directed on the film is in the infrared wave length range and approximately 66% of this energy is reflected.

EXAMPLE 2

An optically thin film having four alternating layers of a high index of refraction material (lead tungstate) and three alternating layers of a low index of refraction material (cryolite) is applied to a glass substrate to selectively alter the optical characteristics of the substrate.

The lead tungstate is applied to the glass substrate having a surface area of 120 square centimeters and a thickness of 0.3 centimeter, by the thermal evaporation process, until a film thickness of 1020 angstroms per layer is obtained. The lead tungstate is heated in the thermal evaporator to a temperature where it is capable of being vapor deposited at a rate thickness of 480 angstroms per minute. The cryolite is applied by the thermal evaporation process, as a thin film with a thickness of 1690 angstroms per layer to the outer surface of the lead tungstate film. The cryolite is applied at a rate of thickness of 660 angstroms per minute.

When light having a spectral distribution of solar radiation is directed on the film at an angle of incidence of 0°, approximately 82% of the light within the infrared wave length range (0.70 to 1.15 microns) is reflected. Moreover, approximately 89% of the light within the visible wave length range (0.40 to 0.70 micron) is transmitted through the film. When light having the same spectral distribution, that is the spectral distribution of solar radiation, is directed on the film at an angle of incidence of 30°, the reflectance and transmittance of the infrared light and the visible light respectively, is substantially similar to the results obtained when the light is directed at an angle of incidence of 0°. Moreover, approximately 44% of the incident energy carried by the light directed on the film is in the visible wave length range and only approximately 11% of the energy in this wave length range is reflected. On the other hand, approximately 55% of the incident energy in the light directed on the film is in the infrared wave length range and approximately 62% of this energy is reflected.

Moreover, approximately 44% of the incident energy carried by the light directed on the film is in the visible wave length range and only approximately 11% of the energy in this wave length range is reflected. On the other hand, approximately 55% of the incident energy in the light directed on the film is in the infrared wave length range and approximately 58% of this energy is reflected.

EXAMPLE 3

Four alternating layers of a solid solution of cadmium tungstate and lead molybdate are applied to a glass substrate having a surface area of 120 square centimeters and a thickness of 0.3 centimeter, by the thermal evaporation process, until a film thickness of 1080 angstroms per layer is obtained. The cadmium tungstate and lead molybdate is heated in a thermal evaporator to a temperature where they are capable of being applied at a rate of 350 angstroms per minute. Three alternating layers of magnesium fluoride is applied by the thermal evaporation process, as a thin film with a thickness of 1640 angstroms per layer to the outer surface of the cadmium tungstate and lead molybdate film. The magnesium fluoride is applied at a rate of film thickness of 660 angstroms per minute.

When light having a spectral distribution of solar radiation is directed on the film at an angle of incidence of 0°, approximately 72% of the light within the infrared wave length range (0.70 to 1.15 microns) is reflected. Moreover, approximately 90% of the light within the visible wave length range (0.40 to 0.70 micron) is transmitted through the film. When light having the same spectral distribution, that is the spectral distribution of solar radiation, is directed on the film at an angle of incidence of 30°, the reflectance and transmittance of the infrared light and the visible light respectively, is substantially similar to the results obtained when the light is directed at an angle of incidence of 0°. Moreover, approximately 44% of the incident energy carried by the light directed on the film is in the visible wave length range and only approximately 10% of the energy in this wave length range is reflected. On the other hand, approximately 55% of the incident energy in the light directed on the film is in the infrared wave length range and approximately 54% of this energy is reflected.

EXAMPLE 4

A seven-layer dielectric film consisting of lead molybdate having a refractive index of 2.40 and cryolite having a refractive index of 1.33 was applied to a glass substrate one-fourth inch thick and having a refractive index of 1.520. The layers were successively applied by the vapor deposition process and one of the layers having a high refractive index was in facewise contact with the upper surface of the glass substrate. Thus, the glass substrate had a film which consisted of 4 layers of lead molybdate alternated with 3 layers of cryolite. Radiation from a tungsten lamp source having the spectral distribution of solar radiation was directed on the multilayer dielectric film at an angle of incidence of 30°, and the spectral reflectance curve in FIGURE 2 was obtained by passing a reflected radiation into a "Cary-14" recording spectrophotometer. It can be seen that approximately 90% of radiation at the 0.90 micron wave length was reflected. It can also be seen that 5 subsidiary reflectance peaks were produced in the visible wave length range of 0.40 micron to 0.70 micron. These peaks range from 10 to 22% reflectance within this range, the largest peak being at 0.42 micron having a reflectance of 22%.

A terminating layer of cryolite which was two-thirds the thickness of any of the aforementioned layers was then added by the same vapor deposition process, in order to suppress the pass-band reflectance maxima within the visible light range. Radiation from the same tungsten lamp source having the spectral distribution of solar radiation was then directed on the film at an angle of incidence of 30°, and the spectral reflectance curve was again obtained by passing the reflected light into the same "Cary" recording spectrophotometer. The reflectance at the 0.90 micron wave length was not affected by the additional layer, but that the maximum subsidiary reflectance at 0.42 micron was reduced to 14%. Moreover, each of the other subsidiary reflectance maxima were reduced.

When radiation from the tungsten lamp source having the spectral distribution of solar radiation was directed on the film at the angle of incidence of 30°, the following data was obtained.

TABLE

| Spectral region | Wave lengths (microns) | Incident energy (percent) | Reflected energy (percent) | Mean energy reflectance (percent) |
| --- | --- | --- | --- | --- |
| UV | 0.30–0.40 | 2.7 | .7 | 27.5 |
| Visible | 0.40–0.70 | 44.4 | 2.5 | 5.7 |
| IR-1 | 0.70–1.12 | 36.4 | 23.7 | 65.0 |
| IR-2 | 1.12–1.38 | 8.6 | 2.3 | 26.2 |
| IR-3 | 1.38–1.85 | 6.6 | 1.2 | 18.2 |
| IR-4 | 1.85–2.14 | 1.2 | .04 | 3.5 |
| Total | 0.30–2.14 | 100.0 | 30.5 | 30.5 |

Having thus described our invention, what we desire to claim and secure by Letters Patent is:

1. An optical device for selective reflectance and transmittance of radiation over an extended spectral range comprising a substrate which is transparent in the wave length range in which it is desired to transmit radiation, said substrate having a surface carrying an optically thin film having at least two layers, at least one optically active layer having an index of refraction of at least 2.0 and having a thickness of at least one-fourth wave length and being selected from the group of compounds consisting of lead molybdate, lead tungstate, and lead chromate and at least one layer having an index of refraction of no greater than 1.6.

2. The optical device of claim 1 for selective reflectance and transmittance of radiation in which the layer with the high index of refraction is lead molybdate.

3. The optical device of claim 1 for selective reflectance and transmittance of radiation in which the layer with the high index of refraction is formed of lead tungstate.

4. The optical device of claim 1 for selective reflectance and transmittance of radiation in which the layer with the high index of refraction is formed of lead chromate.

5. An optical device for selective reflectance and transmittance of radiation over an extended spectral range comprising a substrate which is transparent in the wave length range in which it is desired to transmit radiation, said substrate having a surface carrying an optically thin film having at least two layers, at least one optically active layer having an index of refraction of at least 2.0 and having a thickness of at least one-fourth wave length and being formed from a solid solution of at least two compounds selected from the class consisting of lead molybdate, lead tungstate and lead chromate, and at least one layer having an index of refraction of no greater than 1.6.

6. An optical device for selective reflectance and transmittance of radiation over an extended spectral range comprising a substrate which is transparent in the wave length range in which it is desired to transmit radiation, said substrate having a surface carrying an optically thin film having at least two layers, at least one optically active layer having an index of refraction of at least 2.0 and being formed from a solid solution of a compound selected from the class consisting of tin molybdate, tin tungstate, tin chromate, cadmium molybdate, cadmium tungstate, cadmium chromate, and compound selected from the class consisting of lead molybdate, lead tungstate and lead chromate, and at least one layer having an index of refraction of no greater than 1.6.

7. An optical device for selective reflectance and transmittance of radiation over an extended spectral range comprising a substrate which is transparent in the wave length range in which it is desired to transmit radiation, said substrate having a surface carrying an optically thin film having at least two layers, at least one optically active layer having an index of refraction of at least 2.0 and having a thickness of at least one-fourth wave length and being selected from the group of compounds consisting of lead molybdate, lead tungstate, and lead chromate and at least one layer having an index of refraction of no greater than 1.6 and a thickness of at least one-fourth wave length.

8. An optical device for selective reflectance and transmittance of radiation over an extended spectral range comprising a substrate which is transparent in the wave length range in which it is desired to transmit radiation, said substrate having a surface carrying an optically thin film having at least two layers, at least one optically active layer having an index of refraction of at least 2.0 and having a thickness within the range of 0.05 to 0.20 micron and being selected from the group of compounds consisting of lead molybdate, lead tungstate, and lead chromate and at least one layer having an index of refraction of no greater than 1.6 and a thickness within the range of 0.12 to 0.22 micron.

9. An optical device for selective reflectance and transmittance of radiation over an extended spectral range comprising a substrate which is transparent in the wave length range in which it is desired to transmit radiation, said substrate having a surface carrying an optically thin film having at least two layers, at least one optically active layer having an index of refraction of at least 2.0 and having a thickness of at least one-fourth wave length and being selected from the group of compounds consisting of lead molybdate, lead tungstate, and lead chromate and at least one layer having an index of refraction of no greater than 1.6 and being selected from the class consisting of magnesium fluoride, cryolite, calcium fluoride, lithium fluoride, aluminum fluoride, calcium silicate, and aluminum oxide.

10. An optical device for selective reflectance and transmittance of radiation over an extended spectral range comprising a substrate which is transparent in the wave length range in which it is desired to transmit radiation, said substrate having a surface carrying an optically thin film having a plurality of optically active alternating layers of high and low indices of refraction, the optically active high index of refraction layers having an index of refraction of at least 2.0 and having a thickness determined according to the relationship $t_h = \lambda_0 / 4 n_h$ where $t_h$ is the thickness of the high index of refraction layer, $\lambda_0$ is the wave length to be reflected at the center of the principal reflectance band and $n_h$ is the index of refraction of such high index of refraction layers, said high index of refraction layers having a thickness of at least one-fourth wave length and being selected from the group of compounds consisting of lead molybdate, lead tungstate, and lead chromate, the low index of refraction layers having an index of refraction of no greater than 1.6 and having a thickness determined according to the relationship $$t_L = \lambda_0/4n_L$$

where $t_L$ is the thickness of the low index of refraction layers, $\lambda_0$ is as defined above and $n_L$ is the index of refraction of such low index of refraction layers, said low index of refraction layers having a thickness of at least one-fourth wave length.

References Cited

UNITED STATES PATENTS 2,624,238  1/1953  Widdop et al. _____ 117—33.3 X
2,834,689  5/1958  Jupnik _____ 117—33.3

WILLIAM D. MARTIN, *Primary Examiner.*

M. R. P. PERRONE, JR., *Assistant Examiner.*

U.S. Cl. X.R.

350—1; 117—33.3, 69, 124, 138.8